(12) United States Patent
Morris

(10) Patent No.: US 7,600,686 B2
(45) Date of Patent: Oct. 13, 2009

(54) MEDIA CONTENT MENU NAVIGATION AND CUSTOMIZATION

(75) Inventor: Ronald Morris, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 11/290,342

(22) Filed: Nov. 30, 2005

(65) Prior Publication Data

US 2007/0124773 A1    May 31, 2007

(51) Int. Cl.
    *G06K 7/10* (2006.01)
(52) U.S. Cl. .................. 235/462.01; 235/375
(58) Field of Classification Search ............ 235/462.01, 235/375, 380, 381, 383; 725/28, 44, 35, 725/38, 58, 70
    See application file for complete search history.

(56) References Cited

U.S. PATENT DOCUMENTS 6,268,849 B1    7/2001    Boyer et al.

2002/0157101 A1    10/2002    Schrader et al.
2004/0158862 A1    8/2004    Nam et al.
2004/0268419 A1    12/2004    Danker et al.

FOREIGN PATENT DOCUMENTS

| WO | WO9709827 A1 | 3/1997 |
| WO | WO9921308 A1 | 4/1999 |
| WO | WO2005017897 A1 | 2/2005 |

*Primary Examiner*—Thien M Le
(74) *Attorney, Agent, or Firm*—Lee & Hayes, PLLC

(57) ABSTRACT

Media content menu navigation and customization is described. In an embodiment, a content menu is displayed that includes a listing which collectively identifies media content that is available for viewing from multiple data streams. The multiple data streams can each provide different media content that is collectively identified where the different media content of each data stream is related. Each of the multiple data streams of the media content are mapped to a television channel and each data stream has an associated sub-channel identifier. At least some of the sub-channel identifiers are displayed and optionally an associated image corresponding to the media content that is available for viewing via the associated sub-channel is displayed.

20 Claims, 10 Drawing Sheets

MEDIA CONTENT MENU NAVIGATION AND CUSTOMIZATION

BACKGROUND

Currently, special televised events such as the Olympics, Presidential elections and parties, and the various music charity benefit concerts such as "Live 8" and "Farm Aid" are provided for viewing on one television channel, or across a random selection of television channels. For example, a particular network may provide a special event for viewing and then televise the event via the various channel(s) associated with the particular network.

A particular television network may include a typical broadcast channel and may also include various cable channels and/or additional movie channels. The various channels are typically not consecutively listed in a program guide, but rather are dispersed throughout the many available channels listed in the program guide making it difficult for a viewer to locate all of the events or performances that are available for viewing and which correspond to a televised special event. A viewer interested in the various events or performances of a particular special event has to either watch one linear broadcast of the event, or navigate across multiple television channels.

In addition, the current hierarchical structuring of user interfaces for television, such as an electronic program guide, makes it difficult to promote the special events when they are to be televised. The current user interfaces for television often occupy the entire screen making it difficult to promote, advertise, or lead with specific popular or promotional content, special events, products, or branding corresponding to the promotional content, products, and/or special events.

SUMMARY

This summary is provided to introduce simplified concepts of media content menu navigation and customization which is further described below in the Detailed Description. This summary is not intended to identify essential features of the claimed subject matter, nor is it intended for use in determining the scope of the claimed subject matter.

In an embodiment of media content menu navigation and customization, media content is received at a television-based client device and displayed for viewing on a display device. A user-selectable menu input is received via a television-based remote control device and, in response, a content menu is displayed over the media content. The content menu includes regularly available media content and a listing for a special event and/or promoted content that is available for viewing for a limited period of time.

In another embodiment, a user-selectable input is received via the television-based remote control device to select the listing for the special event and/or promoted content that is included in the content menu, and an updated content menu is displayed that includes listings corresponding to the selected listing for the special event and/or promoted content. A promotional image can be displayed over the media content upon receiving the user-selectable input where the promotional image is associated with the listing for the special event and/or promoted content. In addition, a graphic can be displayed as an image and/or text associated with the listing for the special event and/or promoted content. The graphic and the promotional image can be brand identifiers corresponding to the special event and/or promoted content, and are displayed to promote the special event and/or promoted content and to encourage viewer selection of the special event and/or promoted content.

In an embodiment of media content menu navigation and customization, a content menu is displayed that includes a listing which collectively identifies media content that is available for viewing from multiple data streams. The multiple data streams can each provide different media content that is collectively identified where the different media content of each data stream is related. Each of the multiple data streams of the media content are mapped to a television channel and each data stream has an associated sub-channel identifier. At least some of the sub-channel identifiers are displayed and optionally an associated image corresponding to the media content that is available for viewing via the associated sub-channel is displayed.

In another embodiment, an additional user-selectable input of a sub-channel identifier can be received and the media content corresponding to the selected sub-channel identifier is displayed. The additional user-selectable input of the sub-channel identifier can be received whether the sub-channel identifier is displayed for viewing or not. The display of the media content corresponding to the selected sub-channel identifier is initiated by switching sub-channels without changing the television channel.

In an embodiment of media content menu navigation and customization, a content menu is displayed that includes a listing for a category of media content that is available for viewing. A user-selectable input is then received to select the category of the media content from the content menu. In response to the user-selectable input, a promotional image corresponding to the selected category of the media content is displayed and an updated content menu that includes listings of sub-categories of the media content is displayed. An additional user-selectable input is received to select a sub-category of the media content from the updated content menu, and an additional promotional image corresponding to the selected sub-category of the media content is displayed where the additional promotional image is associated with the promotional image by the user-selectable inputs. In an example, the media content is a televised special event, the promotional image is a logo corresponding to the televised special event, and the additional promotional image is an advertisement for a sponsor of the televised special event.

BRIEF DESCRIPTION OF THE DRAWINGS

The same numbers are used throughout the drawings to reference like features and components.

DETAILED DESCRIPTION

Media content menu navigation and customization provides for a special event and/or promoted content that is available for viewing for a limited period of time can be included in a media content menu that typically includes regularly available media content. The special event and/or the promoted content can be accompanied by promotional artwork, images, and/or brand identifiers to create a user experience that is customizable and event driven. The special event and/or promoted content can be any televised special and/or promoted event that is available for viewing for a limited period of time, and which is included in a content menu to promote and make a special event more noticeable and accessible to viewers.

Media content menu navigation and customization also provides an environment where a user can quickly navigate through a set of sub-channels to control which events or performances of a televised event to watch. A content menu can include a listing that collectively identifies a special event and/or promoted content that is available for viewing from multiple data streams. The multiple data streams can each provide a different event or performance related to the special event and/or promoted content.

Media content menu navigation and customization also provides that a promotional image, such as a logo, corresponding to a special event and/or promoted content can also correspond to an additional promotional image, such as an advertising image, based on user-selectable inputs. The display of a promotional image (e.g., a logo) and the subsequent display of an additional promotional image (e.g., an advertising image) can be a hierarchical presentation of product brands based on the user-selectable inputs to select the special event and/or the promoted content, and to select a sponsor of the special event.

While aspects of the described systems and methods for media content menu navigation and customization can be implemented in any number of different computing systems, television-based systems, gaming systems, environments, and/or configurations, embodiments of media content menu navigation and customization are described in the context of the following exemplary system architectures.

Figure 1:
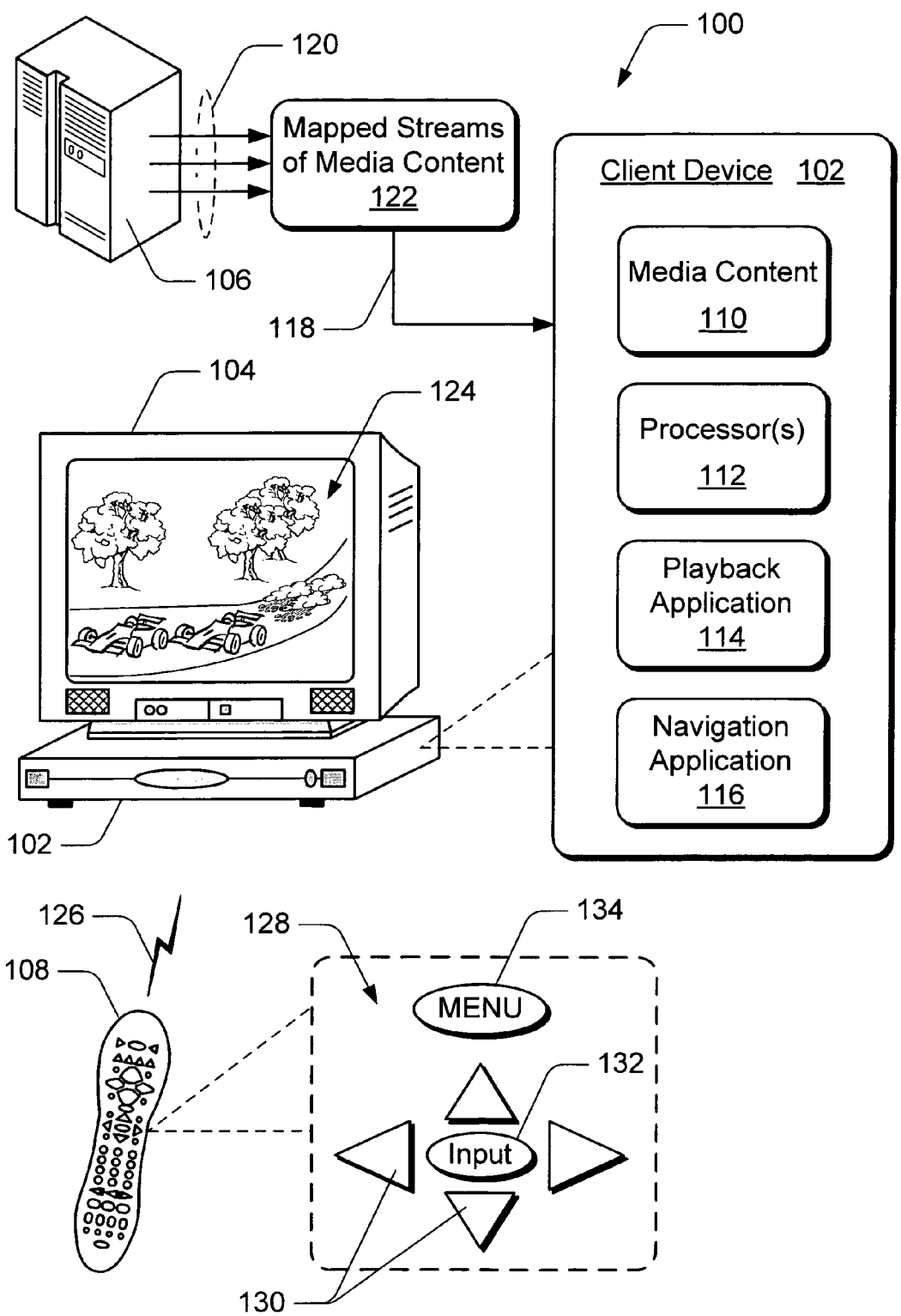
FIG. 1 illustrates an exemplary television-based system in which embodiments of media content menu navigation and customization can be implemented.

FIG. 1 illustrates an exemplary television-based system 100 in which embodiment(s) of media content menu navigation and customization can be implemented. The television-based system 100 includes a client device 102, a display device 104, content provider(s) 106, and a television-based-remote control device 108. The display device 104 can be any type of television, monitor, or similar television-based display system that renders audio, video, and/or image data. The client device 102 and display device 104 together are but one example of a television-based client system, examples of which are described with reference to the exemplary IP-based television (IPTV) system 1100 shown in FIG. 11, and with reference to the exemplary entertainment and information system 1300 shown in FIG. 13.

Client device 102 can be implemented in any number of embodiments, such as a set-top box, a digital video recorder (DVR) and playback system, an appliance device, a gaming device, and as any other type of client device that may be implemented in an entertainment and/or information system. In this example, client device 102 includes media content 110, one or more processor(s) 112, a playback application 114, and a navigation application 116 which can be implemented as computer executable instructions and executed by the processor(s) 112. Additionally, client device 102 may be implemented with any number and combination of differing components as further described below with reference to the exemplary client device 1200 shown in FIG. 12. For example, the navigation application 116 may be implemented as a component of the program guide application included in the exemplary client device 1200.

The media content 110 may be any form of on-demand and/or broadcast media content such as programs, movies, commercials, music, and similar audio, video, and/or image content that client device 102 receives and/or records. Further, client device 102 may access or receive additional recorded media content that is maintained with a remote data store (not shown), such as from a video-on-demand server, or media content that is maintained at a broadcast center or content provider that distributes the media content to subscriber sites and client devices.

The television-based client device 102 is configured for communication with the content provider(s) 106 via a communication network 118, which in this example, is an IP-based network. The client device 102 receives program content, various forms of media content, program guide data, advertising content, and other media content from content server(s) of the content provider(s) 106 via the IP-based network 118. In this example, the content provider(s) 106 map multiple data streams 120 of media content to a particular television channel and dynamically assign sub-channel identifiers to each data stream of media content which is then delivered to the client device 102 as the mapped streams of media content 122 and which is maintained as the media content 110.

The playback application 108 is a video control application that, in this example, can be implemented to control the playback of the media content 110, or other video on-demand media content, music, a slideshow, and any other audio, video, and/or image media content which can be rendered and/or displayed for viewing as video 124 on the display device 104. The playback application 114 and the navigation application 116 can each be implemented to receive user-selectable input commands 126, such as from the remote control device 108. Further, the navigation application 116 implements embodiments of media content menu navigation and customization as further described herein.

The television-based remote control device 108 includes various configuration and television-specific input keys, an input keypad, and various user-selectable input controls 128. The input controls 128 include directional media navigation controls 130, an input control 132, and a menu control 134 to initiate displaying a content menu having selectable listings of media content that is available for viewing. The remote control device 108 may include any number of other various user-selectable input controls.

Figure 2:
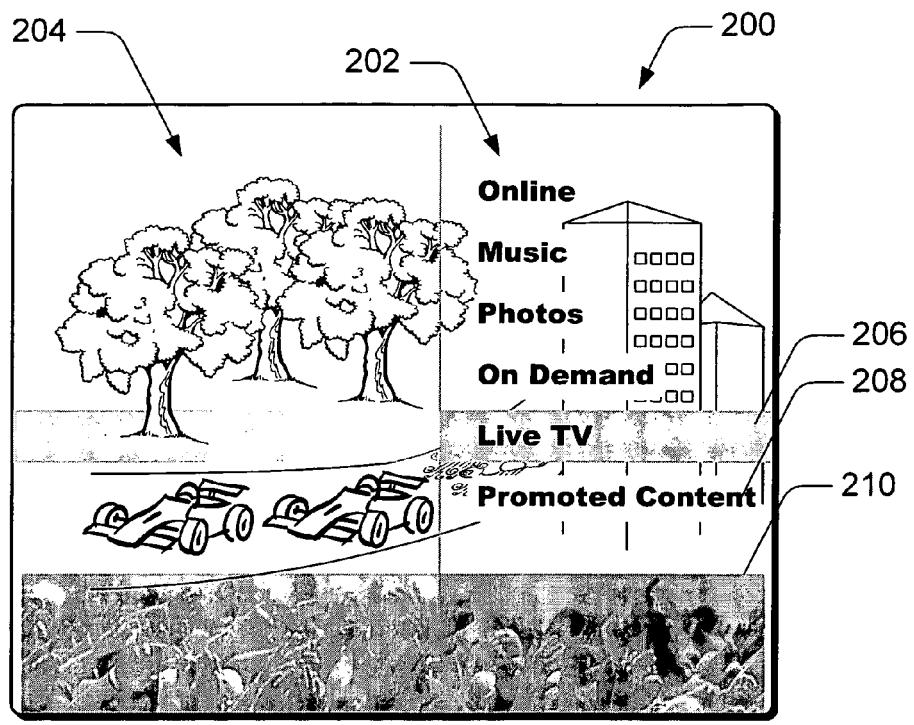
FIG. 2 illustrates an exemplary display in which a media content menu includes a listing for promoted content in an embodiment of media content menu navigation and customization.

FIG. 2 illustrates an exemplary display 200 in an embodiment of media content menu navigation and customization. The display 200 includes a content menu 202 (also referred to herein as a "media content menu") which is displayed over media content 204 that is displayed for viewing, such as the video 124 shown displayed on the display device 104 in FIG. 1. The navigation application 116 initiates the display of the content menu 202 over the media content 204 when a user-selectable menu input is received from a viewer, such as with the menu control 134 on the television-based remote control device 108. For example, when a viewer watching the television program 204 inputs a menu selection via the remote control device 108, the content menu 202 is initiated with a "Live TV" option hi-lited in a focus 206 of the content menu 202.

In this example, the content menu 202 also includes a listing for a special event which is identified as "Promoted Content" 208 in the content menu. The promoted content 208 may be any televised special and/or promoted event that is available for viewing for a limited period of time, and which is identified in the content menu 202 to promote and make a special event more noticeable and/or accessible to viewers to facilitate user ease in finding new and/or desired content.

A special event can be included in the content menu 202 by a content provider 106 and delivered to the television-based client device 102 to be displayed when initiated by a viewer. The promoted content 208 can include any type of various special events, such as the Olympics which are available for viewing for two weeks, Presidential elections and parties, or a music benefit concert which may only be available for viewing one evening, and sports association playoffs such as the World Series, football playoffs and bowl games, sports championships, and the like that are typically only available for viewing for a few days or weeks.

The exemplary display 200 also includes a graphic 210 that is displayed over the media content 204, and which is related to the listing for the special event of promoted content 208 in the content menu 202. In this example, the graphic 210 is an image, but could be text and/or a combination of text and an image to promote the special event listed in the content menu 202.

Figure 3:
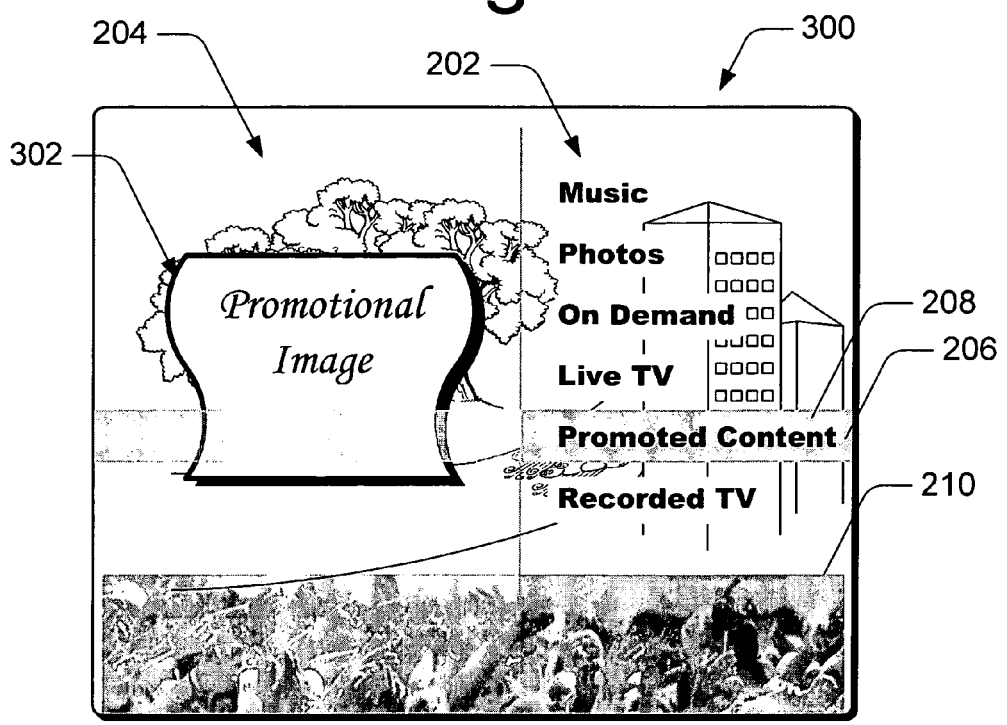
FIG. 3 illustrates an exemplary display that includes a media content menu and a promotional image which corresponds to a listing for promoted content included in the media content menu in an embodiment of media content menu navigation and customization.

FIG. 3 illustrates an exemplary display 300 in an embodiment of media content menu navigation and customization. The display 300 includes the content menu 202 which is displayed over media content 204 that is displayed for viewing. This example illustrates that a viewer has scrolled vertically down the content menu 202 to hi-lite and select the promoted content 208. In addition to the graphic 210 that is related to the listing for the special event of promoted content 208 in the content menu 202, the navigation application 116 initiates a display of a promotional image 302 over the media content 204 when the promoted content 208 is selected in the content menu 202. The promotional image 302 is also related to the special event listing for the promoted content 208 in the content menu 202.

The graphic 210 and the promotional image 302 can be implemented as brand identifiers that correspond to a special event, such as the promoted content 208, to promote the special event. For example, the promoted content 208 may be listed in the content menu 202 as the "Olympic Games" and the promotional image 302 displayed as the corresponding Olympic rings. The graphic 210 represents a cheering crowd that may be associated with an Olympic event. As such, the Olympic rings and the cheering crowd would serve to promote the special event, "Olympic Games", when listed in the content menu 202.

Figure 4:
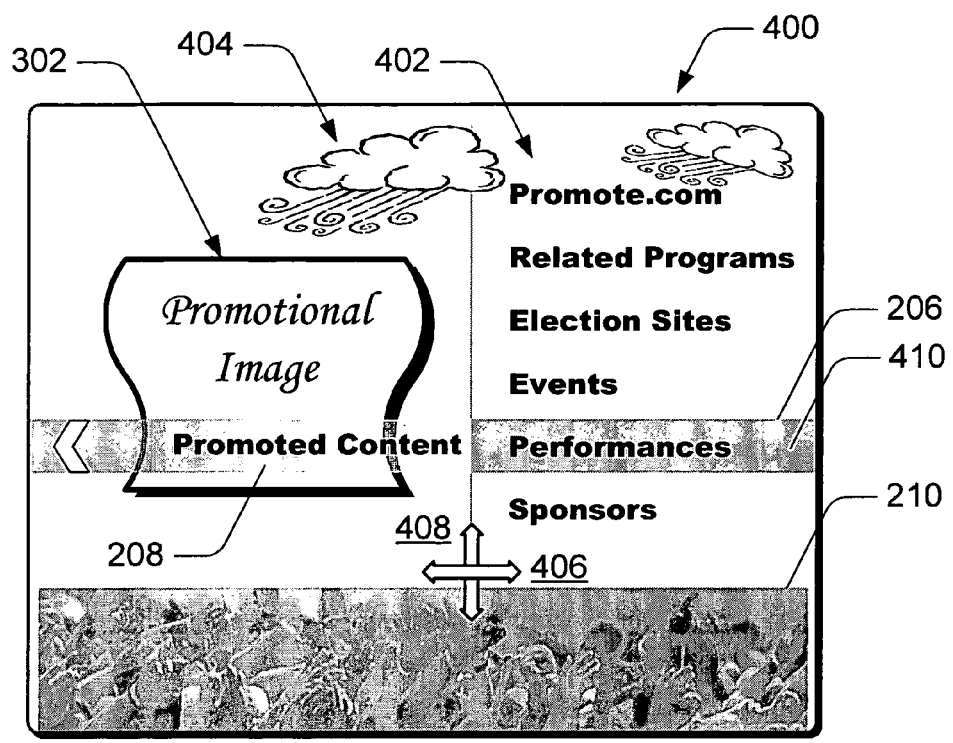
FIG. 4 illustrates an exemplary display in which an updated media content menu includes listings and/or sub-categories corresponding to promoted content in an embodiment of media content menu navigation and customization.

FIG. 4 illustrates an exemplary display 400 in an embodiment of media content menu navigation and customization. The display 400 includes a content menu 402 which is displayed over a background image 404. This example illustrates that the content menu 402 is a two-axis menu along an x-axis 406 and a y-axis 408. The example also illustrates that a viewer has selected the special event listing for the promoted content 208 included in the content menu 202 shown in FIG. 3. When a user-selectable input is received to select the special event listing, the navigation application 116 initiates the display of the updated content menu 402 which includes selectable listings or sub-categories corresponding to the selected special event listing 208.

In this example, the updated content menu 402 includes a listing for "Performances" 410 which is a sub-category of the promoted content 208. The sub-category is also a listing that collectively identifies media content that is available for viewing from multiple streams, such as the mapped streams of media content 122 that is delivered from a content provider 106 to the television-based client device 102. The multiple data streams 120 each provide different media content that is related, and that is collectively identified by the listing for performances 410.

Figure 5:
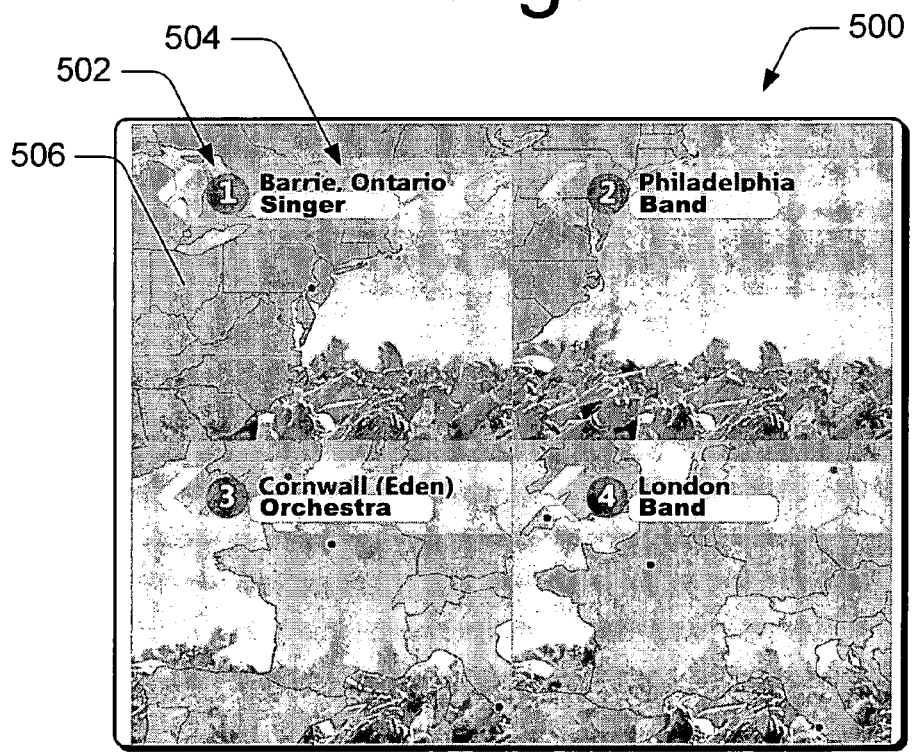
FIG. 5 illustrates an exemplary display of media content and corresponding sub-channel selections related to a media content menu selection in an embodiment of media content menu navigation and customization.

FIG. 5 illustrates an exemplary display 500 in an embodiment of media content menu navigation and customization. The display 500 illustrates that a viewer has selected the sub-category listing for the performances 410 of the promoted content 208, which in this example is a music charity benefit that includes several performances located throughout the World. Rather than showing the performances selections as text, the performances selections are sub-channel identifiers 502 displayed with text 504 (e.g., a location) and an image 506 (e.g., a map of the performance location). In this example, four such performances are displayed and are available for selection to view a musical performance. Optionally, a video of the media content corresponding to a performance can be displayed along with, or in addition to, the sub-channel identifiers 502, text 504, and/or images 506.

A user-selectable input of a sub-channel identifier 502 can be received from a viewer via the television-based remote control device 108, and the media content for the particular performance corresponding to the sub-channel identifier 502 can be displayed for viewing. The navigation application can initiate the display of the media content corresponding to the selected sub-channel identifier 502 by switching sub-channels without changing the television channel that the multiple data streams are mapped to. The television-based client system can receive the selected sub-channel identifier as a user-selectable input when the sub-channel identifier is displayed for viewing, or when the sub-channel identifier is not displayed for viewing. A user can quickly navigate between the mapped video streams that correspond to the different musical performances by simply entering the sub-channel number on the remote control device 108.

Figure 6:
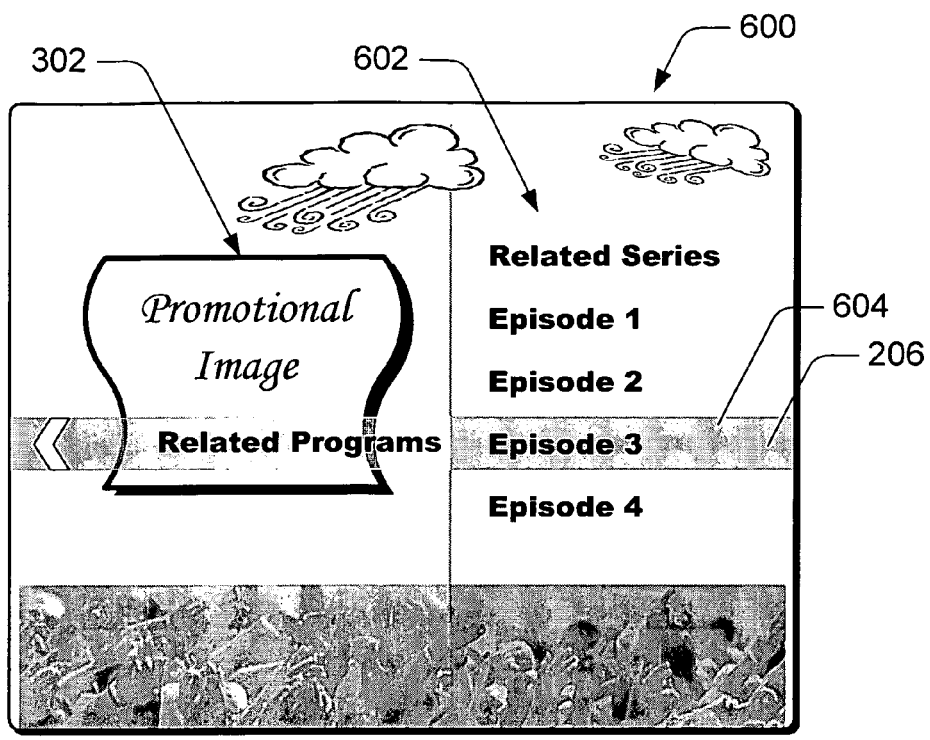
FIG. 6 illustrates another exemplary display in which an updated media content menu includes listings and/or sub-categories corresponding to promoted content in an embodiment of media content menu navigation and customization.

FIG. 6 illustrates an exemplary display 600 in an embodiment of media content menu navigation and customization.

The display 600 includes a content menu 602 which illustrates that a viewer has selected the "Related Programs" listing included in the content menu 402 shown in FIG. 4. When a user-selectable input is received to select the content menu listing, the navigation application 116 initiates the display of the updated content menu 602 which includes selectable listings or sub-categories corresponding to the selected content menu listing.

The updated content menu 602 includes listings for program episodes 604 that are related to the promoted content 208 (from FIG. 4). In this example, the promoted content 208 may be a subscription movie channel mini-series and the content menu 602 includes listings for the episodes 604 of the mini-series. As described with reference to FIG. 5, the related programs listing can be implemented as a listing that collectively identifies the episodes 604 as media content that is available for viewing from multiple streams, such as the mapped streams of media content 122 that is delivered from a content provider 106 to the television-based client device 102. The multiple data streams 120 each provide different media content (e.g., different episodes 604) that is related (e.g., episodes of a mini-series).

Figure 7:
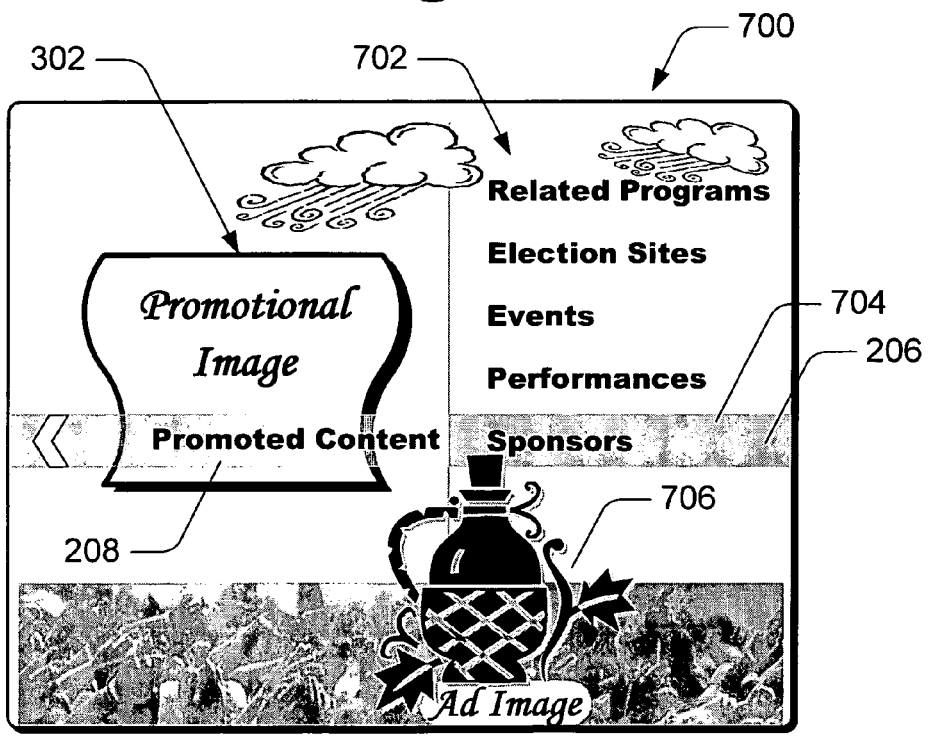
FIG. 7 illustrates an exemplary display of a promotional image and an associated advertising image from a sponsor in an embodiment of media content menu navigation and customization.

FIG. 7 illustrates an exemplary display 700 in an embodiment of media content menu navigation and customization. The display 700 includes a content menu 702 that includes a "Sponsors" listing 704 which is a sub-category of the listing for the promoted content 208. As described with reference to FIGS. 3 and 4, the navigation application 116 initiates a display of the promotional image 302 when the promoted content 208 is selected in the content menu 202. The promotional image 302 is also related to the special event listing for the promoted content 208 in the content menu 202. The navigation application 116 also initiates display of an additional promotional image 706 when the sponsors listing 704 is selected in the related content menu 702.

The promotional image 302 is displayed in response to the first user-selectable input to select the promoted content 208, and the additional promotional image 706 is displayed in response to the second user-selectable input to select the sponsors sub-category 704. The additional promotional image 706 can be an advertising image that is a targeted advertisement for a sponsor of the promoted content. For example, the promotional image may be a sports association logo corresponding to a promoted televised sporting event, and the additional promotional image may then be an advertisement for a sponsor of the promoted sporting event. As such, the display of the promotional image 302 and the subsequent display of the additional promotional image 706 is a hierarchical presentation of product brands based on the user-selectable inputs.

Methods for media content menu navigation and customization, such as exemplary methods 800, 900, and 1000 described with reference to respective FIGS. 8, 9, and 10, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 8:
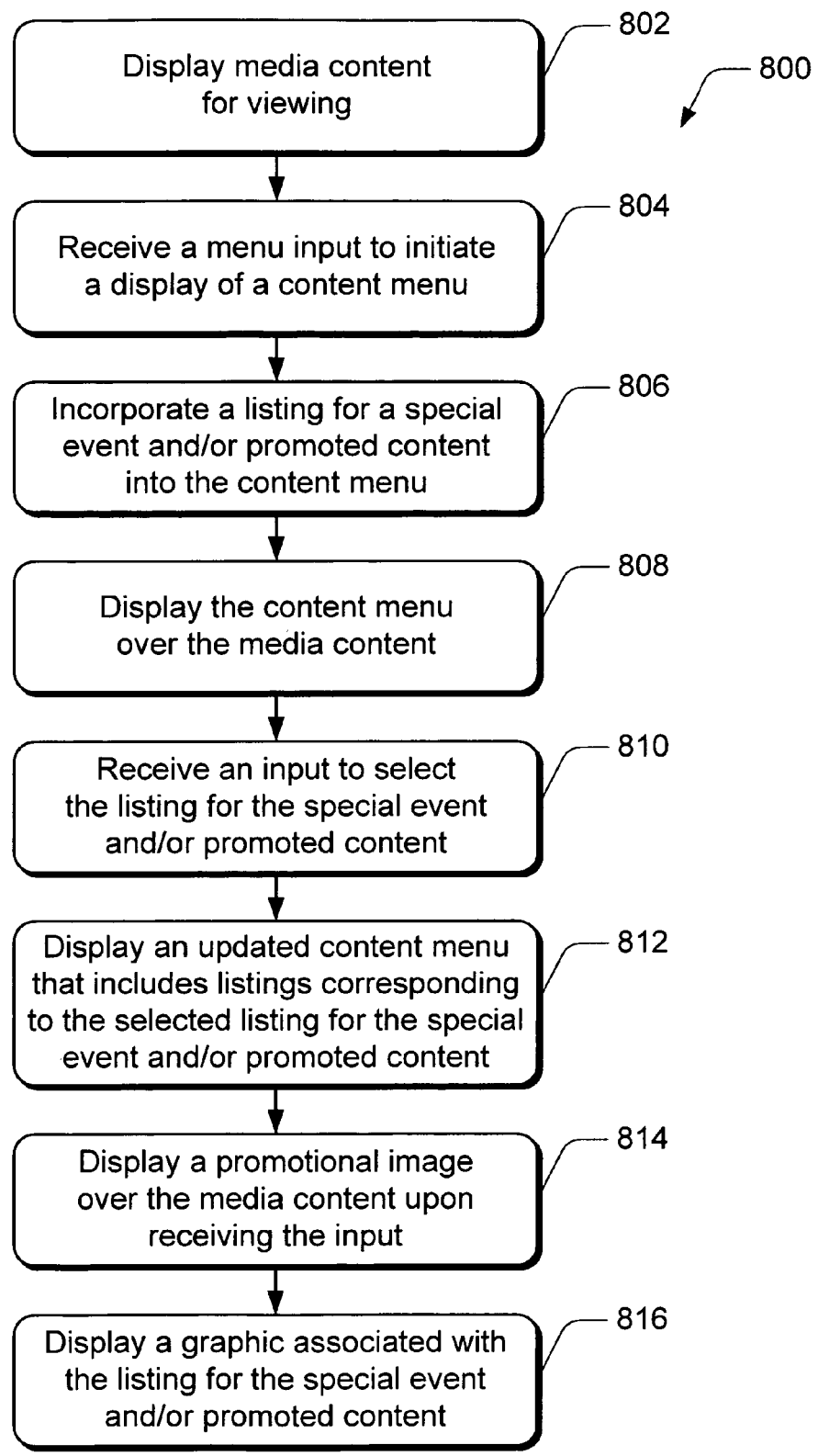
FIG. 8 illustrates exemplary method(s) for media content menu navigation and customization.

FIG. 8 illustrates an exemplary method 800 for media content menu navigation and customization and is described with reference to the exemplary television-based system 100 shown in FIG. 1, and with reference to the displays 200, 300, and 400 shown in respective FIGS. 2, 3, and 4. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 802, media content is displayed for viewing. For example, media content 110 is displayed as a video 124 on display device 104 of the television-based client system. At block 804, a menu input is received via a television-based remote control device to initiate a display of a content menu. For example, a user-selectable menu input 134 can be received via the remote control device 108.

At block 806, a listing for a special event and/or promoted content that is available for viewing for a limited period of time is incorporated into the content menu of regularly available media content. For example, a special event listing for promoted content 208 is incorporated into content menu 202. At block 808, the content menu is displayed over the media content. For example, the content menu 202 is displayed in the exemplary display 200 over the media content 204. The content menu 202 includes the listing for the special event and/or promoted content 208 which can be selected for viewing during the limited period of time that the special event is available.

At block 810, a user-selectable input is received to select the listing for the special event and/or promoted content that is included in the content menu. For example, the television-based client device 102 can receive a user-selectable input to select the special event listing for the promoted content 208 that is included in the content menu 202. At block 812, an updated content menu is displayed that includes listings corresponding to the selected listing for the special event and/or promoted content. For example, updated content menu 402 is displayed in the exemplary display 400 and includes selectable listings that correspond to the selected promoted content listing from content menu 202.

At block 814, a promotional image is displayed over the media content upon receiving the user-selectable input. For example, promotional image 302 is displayed over the media content 204 and the promotional image 302 is associated with the special event listing for the promoted content 208. At block 816, a graphic is displayed that is associated with the listing for the special event and/or promoted content. For example, the graphic 210 is associated with the promoted content 208. The graphic 210 and the promotional image 302 can be brand identifiers corresponding to the special event and/or promoted content, and the brand identifiers are displayed to promote the special event and/or promoted content and to encourage viewer selection of the promoted content.

Figure 9:
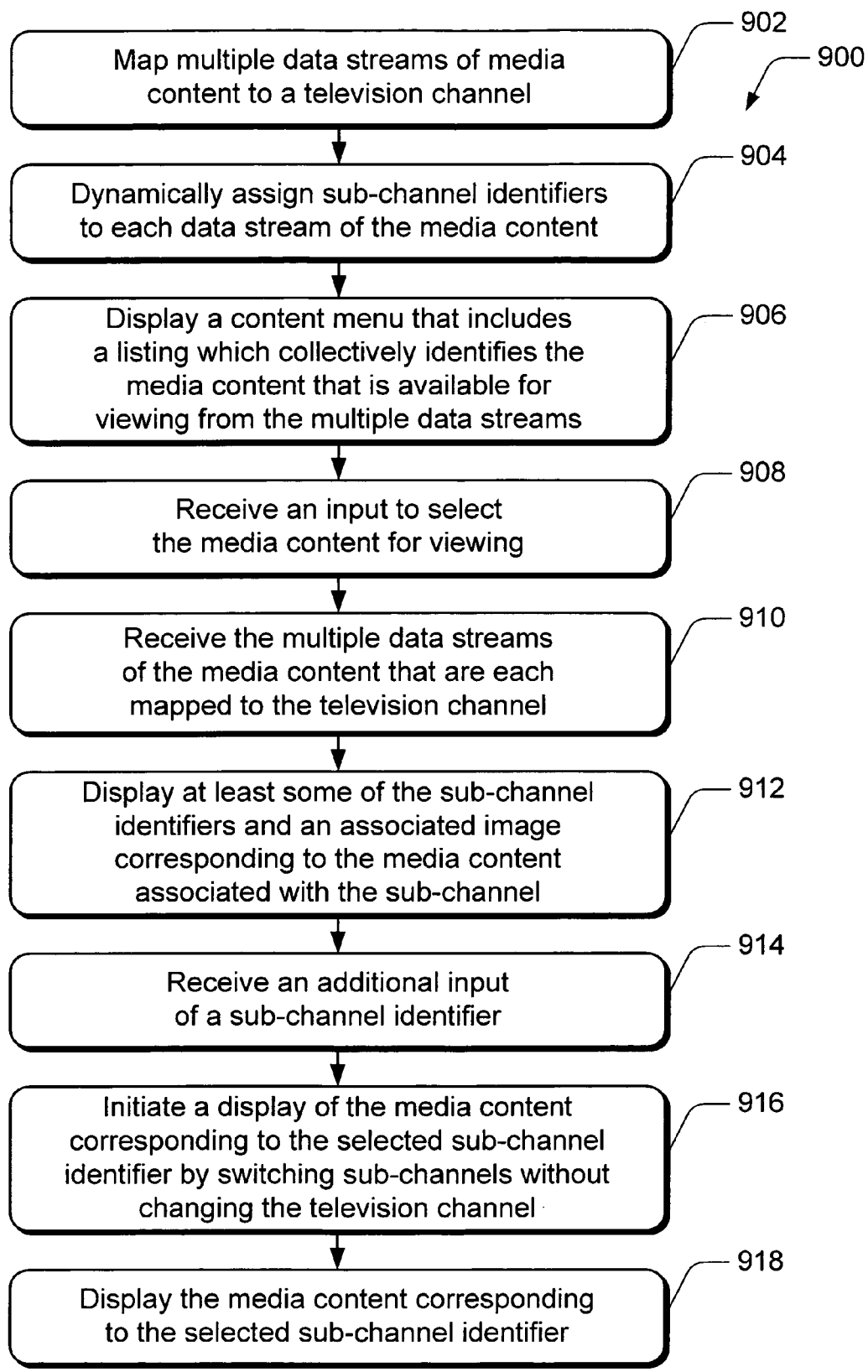
FIG. 9 illustrates additional exemplary method(s) for media content menu navigation and customization.

FIG. 9 illustrates an exemplary method 900 for media content menu navigation and customization and is described with reference to the exemplary television-based system 100 shown in FIG. 1, and with reference to the displays 400, 500, and 600 shown in respective FIGS. 4, 5, and 6. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 902, multiple data streams of media content are mapped to a television channel. At block 904, sub-channel identifiers are dynamically assigned to each data stream of the media content. For example, a content provider 106 maps the multiple data streams 120 to a television channel and dynamically assigns the sub-channel identifiers to each data stream 120.

At block 906, a content menu is displayed that includes a listing which collectively identifies the media content that is available for viewing from the multiple data streams. For example, content menu 402 includes the performances listing 410 which collectively identifies the various concerts that are available for viewing. The multiple data streams each provide different media content (e.g., different concerts) that are related and collectively identified by the performances listing 410 included in the content menu 402.

At block 908, a user-selectable input is received to select the media content for viewing. At block 910, the multiple data streams of the media content that are each mapped to the television channel are received. For example, the television-based client device 102 receives a user-selectable input via the remote control device 108 to select the performances 410 for viewing and the content provider(s) 106 deliver the multiple data streams 120 to the client device 102.

At block 912, at least some of the sub-channel identifiers and an associated image corresponding to the media content that is available for viewing via the associated sub-channel are displayed. For example, the display 500 illustrates sub-channel identifiers 502 displayed with text 504 (e.g., a location) and an image 506 (e.g., a map of the performance location). As an alternative to displaying an image 506, the media content that is available for viewing via each sub-channel can be displayed where sub-channel identifiers are displayed as sub-channel numbers over the respective display of media content to indicate which display of media content is initiated by a sub-channel number.

At block 914, an additional user-selectable input of a sub-channel identifier is received. For example, the television-based client device 102 can receive a user-selectable input via the remote control device 108 to select a sub-channel identifier 502, where the user-selectable input of the sub-channel identifier is received when the sub-channel identifier is displayed for viewing (as in FIG. 5), or when the sub-channel identifier is not displayed for viewing.

At block 916, a display of the media content corresponding to the selected sub-channel identifier is initiated by switching sub-channels without changing the television channel, and at block 918, the media content corresponding to the selected sub-channel identifier is displayed for viewing.

Figure 10:
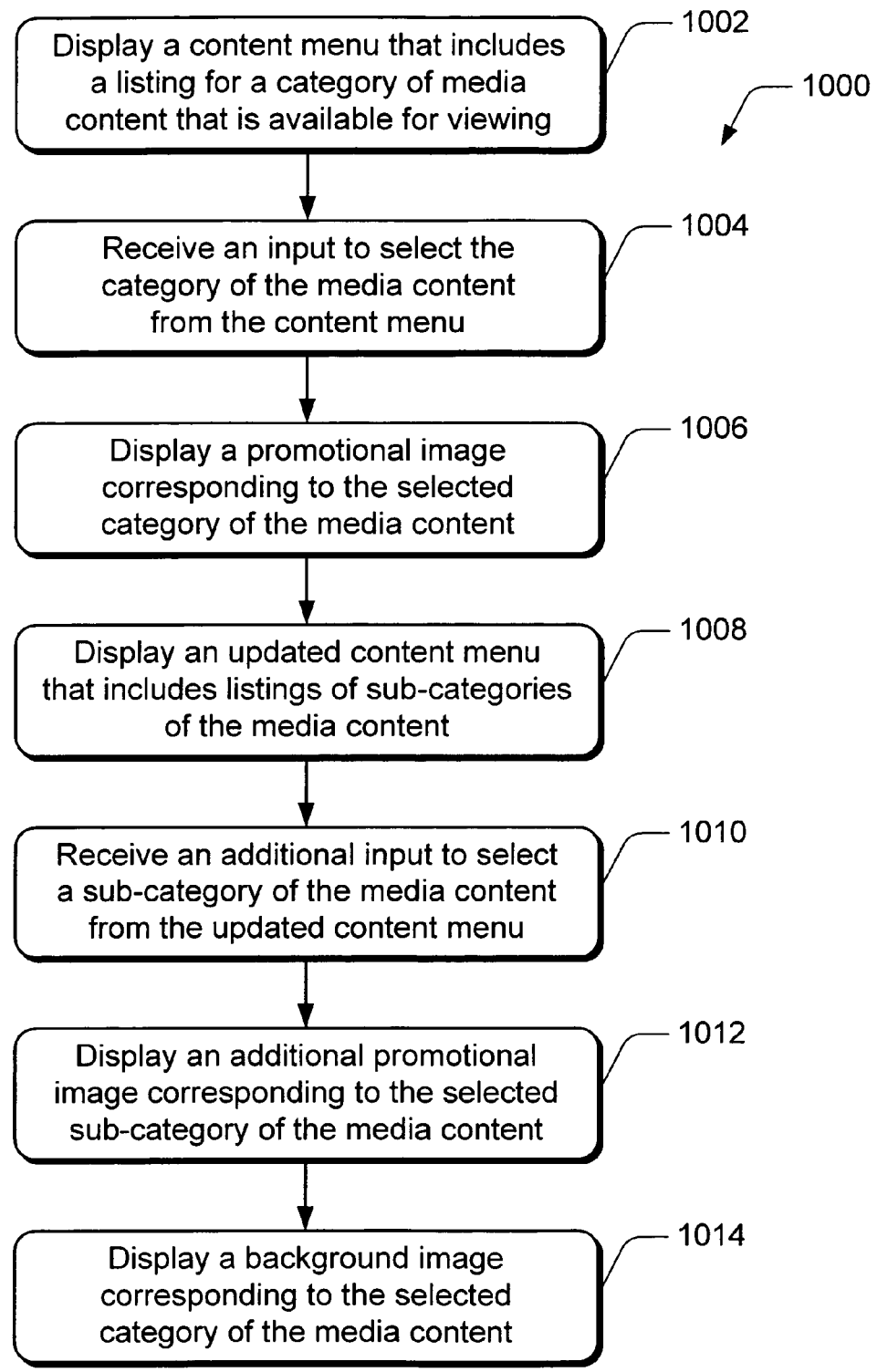
FIG. 10 illustrates additional exemplary method(s) for media content menu navigation and customization.

FIG. 10 illustrates an exemplary method 1000 for media content menu navigation and customization and is described with reference to the exemplary television-based system 100 shown in FIG. 1, and with reference to the displays 300 and 700 shown in respective FIGS. 3 and 7. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 1002, a content menu is displayed that includes a listing for a category of media content that is available for viewing. For example, content menu 202 in display 300 includes a special event listing for promoted content 208 which may be a category of media content for a televised special event. At block 1004, a user-selectable input is received to select the category of the media content from the content menu. For example, the television-based client device 102 receives a user-selectable input to select the promoted content listing 208 in the content menu 202.

At block 1006, a promotional image corresponding to the selected category of the media content is displayed. For example, the promotional image 302 is displayed which corresponds to the selected promoted content listing 208. The promotional image 302 can be a logo that corresponds to the selected category of the media content and/or to a televised special event, and may be a product brand associated with a televised event. At block 1008, an updated content menu is displayed that includes listings of sub-categories of the media content. For example, content menu 702 in display 700 includes listings of sub-categories of the special event listing for the promoted content 208.

At block 1010, an additional user-selectable input is received to select a sub-category of the media content from the updated content menu. For example, a user-selectable input is received to select the sponsors listing 704 in the content menu 702. At block 1012, an additional promotional image corresponding to the selected sub-category of the media content is displayed. For example, the additional promotional image 706 is displayed which corresponds to the sub-category sponsors 704. The additional promotional image 706 is also associated with the promotional image 302 by the user-selectable inputs, and the additional promotional image 706 can be an advertisement and/or a targeted advertisement for a sponsor of the selected category of the media content. The additional promotional image 706 may also be a product brand associated with a sponsor of a televised special event.

At block 1014, a background image corresponding to the selected category of the media content is displayed. The promotional image 302 and the additional promotional image 706 can be displayed over the background image.

Figure 11:
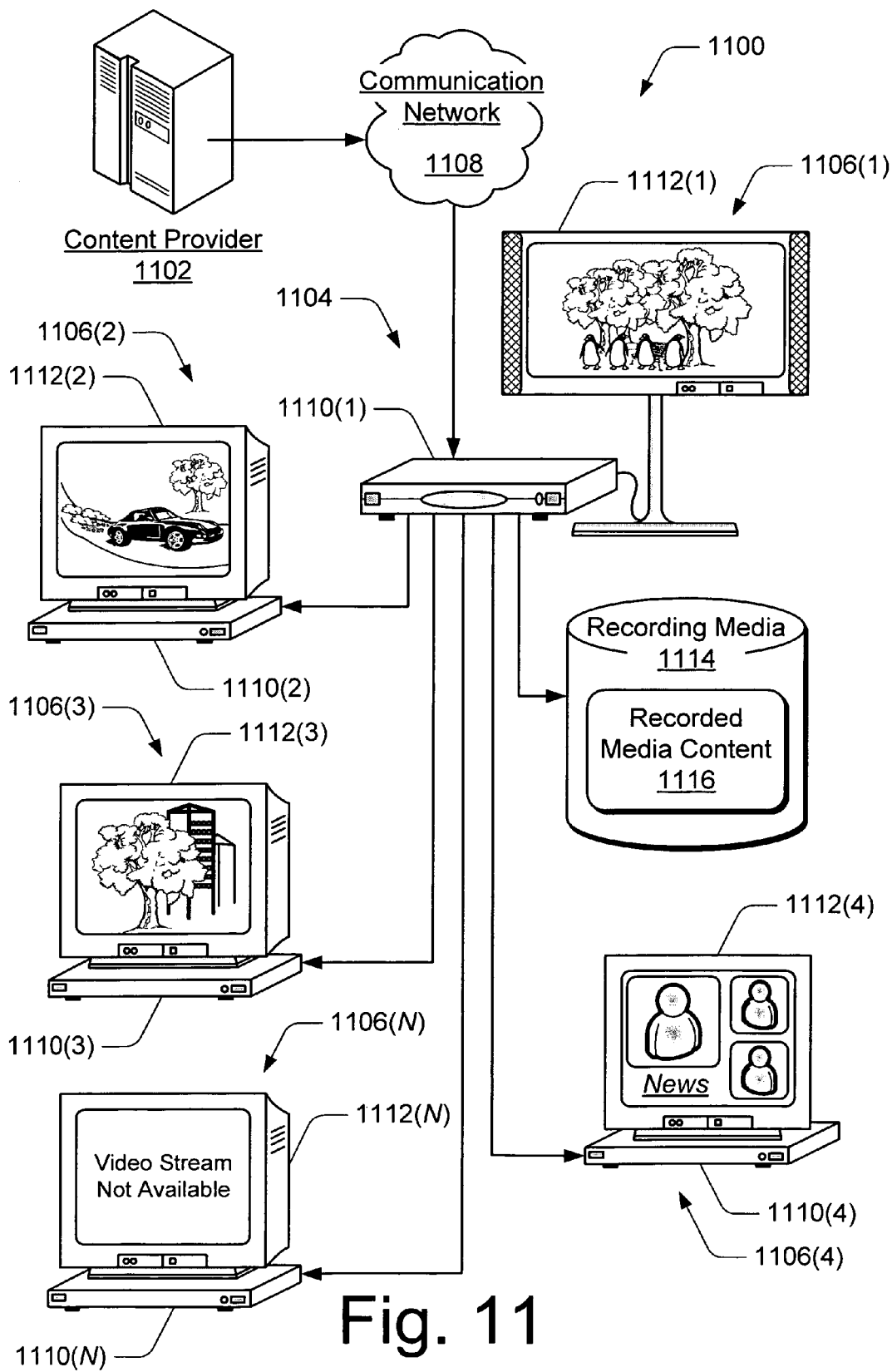
FIG. 11 illustrates an exemplary IP-based television (IPTV) system in which embodiments of media content menu navigation and customization can be implemented.

FIG. 11 illustrates an exemplary IP-based television (IPTV) environment 1100 in which embodiments of media content menu navigation and customization can be implemented. The IPTV environment 1100 includes a content provider 1102 and a viewing system 1104 that can include any number of television-based client systems 1106. A client system 1106(1) is configured for communication with the content provider 1102 via a communication network 1108 which, in this example, is an IP-based network. In addition to the client system 1106(1), the viewing system 1104 includes television-based client systems 1106(2-N), and can represent a household viewing system that has several viewing areas, such as different rooms, for viewing television programming.

Television-based programs may include any form of programs, commercials, music, movies, video on-demand movies and other media content, recorded media content, interactive games, network-based applications, and any other similar audio, video, and/or image content. In addition, programming in general may include music streamed from a computing device to a client device, such as a television-based set-top box, and may also include video on-demand media content delivered from a server, a photo slideshow, and any other audio, video, and/or image content received from any type of media content source.

The television-based client systems 1106(1-N) may be implemented with any number and combination of differing components as further described below with reference to the exemplary client device 1200 shown in FIG. 12. Further, the IPTV environment 1100 may be implemented with any number and combination of differing components as described below with reference to the exemplary entertainment and information system 1300 shown in FIG. 13.

The television-based client system 1106(1) includes a client device 1110(1) and a display device 1112(1), such as any type of television, monitor, or similar television-based display system that renders audio, video, and/or image data. Similarly, the television-based client systems 1106(2-N) each include a respective client device 1110(2-N) and a respective display device 1112(2-N). Each client device 1110 can be implemented in any number of embodiments, such as a set-top box, a digital video recorder (DVR) and playback system, a personal video recorder (PVR), an appliance device, and as any other type of client device that may be implemented in a television-based entertainment and information system.

Client device 1110(1) receives program content from content provider 1102 via the communication network 1108. In the example viewing system 1104, client device 1110(1) is a master client device that receives one or more data streams from content provider 1102 and then arbitrates stream allocation to distribute the data streams, one each, to one or more of the other satellite client devices 1110(2-N). The satellite client devices 1110(2-N) connect to the master client device 1110(1) to receive a data stream for live television, delayed program viewing, and/or recorded DVR playback. The data streams are allocated by the content provider to the viewing system 1104 (e.g., a household), and the data streams can be any combination of high definition and/or standard definition television data streams. For example, the viewing system 1104 may receive one high definition data stream and three standard definition data streams depending upon available bandwidth to deliver the data streams. As more bandwidth becomes available, a viewing system may receive more high definition and/or standard definition data streams.

Although the data streams are not shown specifically, the arrowed communication links illustrate various data communication links which include the data streams. Additionally, the arrowed communication links are not intended to be interpreted as a one-way communication link from client device 1110(1) to client device 1110(2), for example. It is contemplated that any one or more of the arrowed communication links can facilitate two-way data communication, such as from client device 1110(2) to client device 1110(1) for example, and from client device 1110(1) to content provider 1102.

In this system, the master client device 1110(1) receives four (4) data streams from the content provider 1102 via the communication network 1108. A viewing selection from a first data stream is shown for viewing on display device 1112(1) at the television-based client system 1106(1). A second data stream is directed from the master client device 1110(1) to the television-based client system 1106(2) and a viewing selection from a second data stream is shown for viewing on display device 1112(2). Similarly, a third data stream is directed from the master client device 1110(1) to the television-based client system 1106(3) and a viewing selection from the third data stream is shown for viewing on display device 1112(3). Additionally, a fourth data stream is directed from the master client device 1110(1) to the television-based client system 1106(4) and a viewing selection from the fourth data stream is shown for viewing on display device 1112(4).

The available bandwidth for a viewing system, or household as in this example, may not be able to accommodate as many data streams as there are client devices. It is not unusual for a household to have five (5) or more televisions in various rooms and at various locations throughout the house. In this system, the number of client devices exceeds the number of data streams allocated to the viewing system 1104 from the content provider 1102. For example, the viewing system 1104 includes at least a fifth satellite client device 1110(N) of the television-based client system 1106(N). The corresponding display device 1112(N) indicates that no video stream is available because the four (4) data streams allocated to the viewing system 1104 are already being directed to the other client devices 1110(1-4).

The viewing system 1104 also includes recording media 1114 which can be implemented as a DVR system to record and maintain media content 1116, such as any form of programs, movies, and similar audio, video, and/or image content that may be distributed or otherwise received from content provider 1102. In one embodiment, the recording media can be implemented as an independent component of the viewing system 1104 and connected to the master client device 1110(1). Alternatively, the recording media 1114 can be implemented as a component of the master client device 1110(1) which manages recordings initiated from any of the other satellite client devices 1110(2-N). In yet another embodiment, the recording media 1114 may be a distributed recording system where any one or more of the client devices 1110(1-N) include recording media that is centrally managed by the master client device 1110(1).

Figure 12:
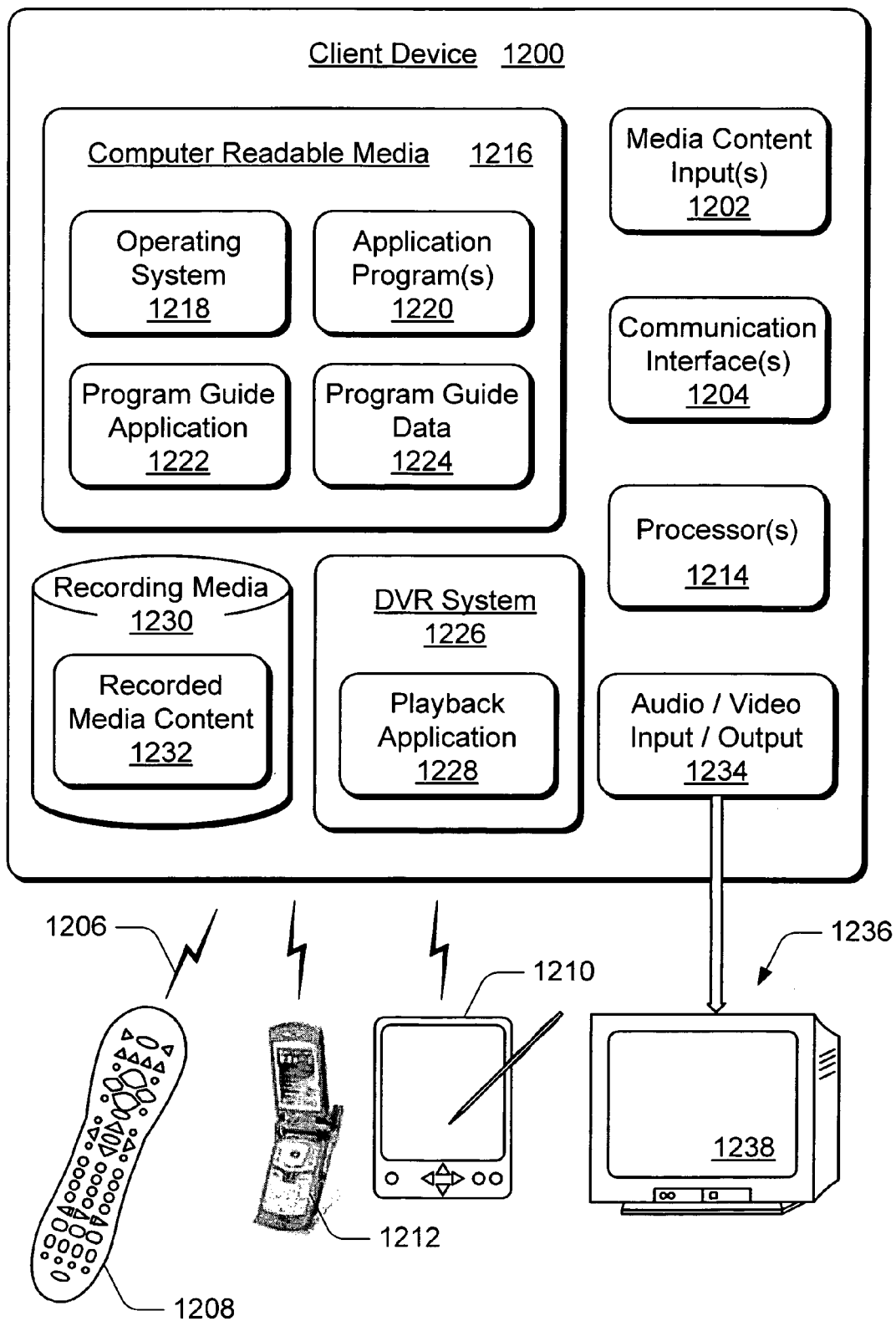
FIG. 12 illustrates various components of an exemplary client device in which embodiments of media content menu navigation and customization can be implemented.

FIG. 12 illustrates various components of an exemplary client device 1200 which can be implemented as any form of a computing, electronic, gaming, and/or television-based client device, and in which embodiments of media content menu navigation and customization can be implemented. For example, the client device 1200 can be implemented as the television-based client device 102 shown in FIG. 1.

Client device 1200 includes one or more media content inputs 1202 which may include Internet Protocol (IP) inputs over which streams of media content are received via an IP-based network. Device 1200 further includes communication interface(s) 1204 which can be implemented as any one or more of a serial and/or parallel interface, a wireless interface, any type of network interface, a modem, and as any other type of communication interface. A wireless interface enables client device 1200 to receive control input commands 1206 and other information from an input device, such as from remote control device 1208, PDA (personal digital assistant) 1210, cellular phone 1212, or from another infrared (IR), 802.11, Bluetooth, or similar RF input device.

A network interface provides a connection between the client device 1200 and a communication network by which other electronic and computing devices can communicate data with device 1200. Similarly, a serial and/or parallel interface provides for data communication directly between client device 1200 and the other electronic or computing devices. A modem facilitates client device 1200 communication with other electronic and computing devices via a conventional telephone line, a DSL connection, cable, and/or other type of connection.

Client device 1200 also includes one or more processors 1214 (e.g., any of microprocessors, controllers, and the like) which process various computer executable instructions to control the operation of device 1200, to communicate with other electronic and computing devices, and to implement embodiments of Sprite interface and code-based functions. Client device 1200 can be implemented with computer readable media 1216, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 1216 provides data storage mechanisms to store various information and/or data such as software applications and any other types of information and data related to operational aspects of client device 1200. For example, an operating system 1218 and/or other application programs 1220 can be maintained as software applications with the computer readable media 1216 and executed on processor(s) 1214 to implement embodiments of media content menu navigation and customization.

For example, client device 1200 can be implemented to include a program guide application 1222 that is implemented to process program guide data 1224 and generate program guides for display which enable a viewer to navigate through an onscreen display and locate broadcast programs, recorded programs, video on-demand programs and movies, interactive game selections, network-based applications, and other media access information or content of interest to the viewer. The application programs 1220 can include programmed application(s) to implement features and embodiments of media content menu navigation and customization as described herein, such as any one or more of the playback application 114 and the navigation application 116. Alternatively, a programmed application can be implemented as an integrated module or component of the program guide application 1222. The client device 1200 can also include a DVR system 1226 with playback application 1228, and recording media 1230 to maintain recorded media content 1232.

The client device 1200 also includes an audio and/or video output 1234 that provides audio and video to an audio rendering and/or display system 1236, or to other devices that process, display, and/or otherwise render audio, video, and image data. Video signals and audio signals can be communicated from device 1200 to a television 1238 (or to other types of display devices) via an RF (radio frequency) link, S-video link, composite video link, component video link, analog audio connection, or other similar communication link.

Figure 13:
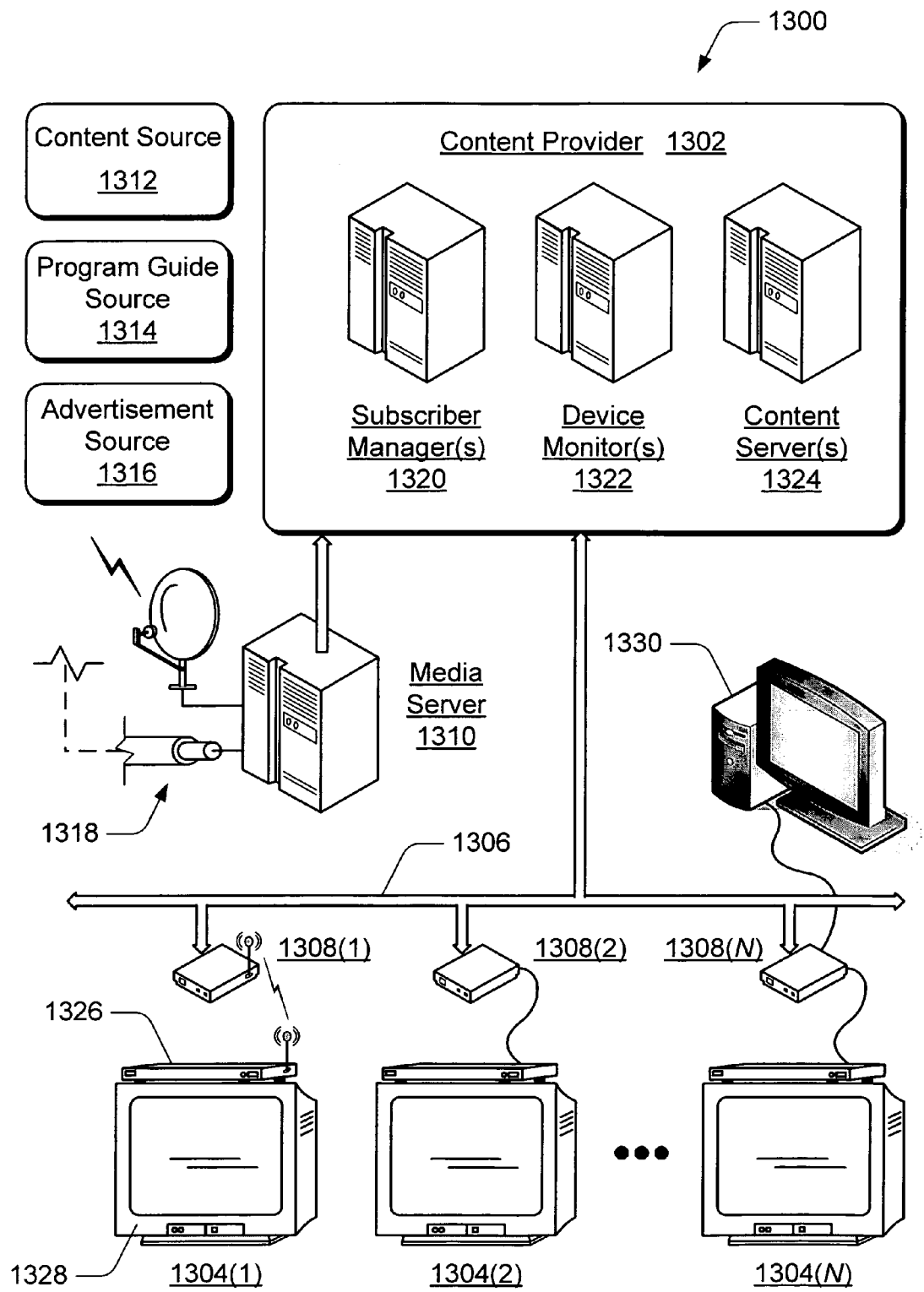
FIG. 13 illustrates various devices and components in an exemplary entertainment and information system in which embodiments of media content menu navigation and customization can be implemented.

FIG. 13 illustrates an exemplary entertainment and information system 1300 in which an IP-based television environment can be implemented, and in which embodiments of media content menu navigation and customization can be implemented. System 1300 facilitates the distribution of program content, program guide data, and advertising content to multiple viewers and to multiple viewing systems. System 1300 includes a content provider 1302 and television-based client systems 1304(1-N) each configured for communication via an IP-based network 1306. Each television-based client system 1304(1-N) is an example of the television-based client system 1106(1) described with reference to FIG. 11. Each of the television-based client systems 1304(1-N) can receive one or more data streams from content provider 1302 and then arbitrate stream allocation to distribute the data streams, one each, to one or more other satellite client devices in a viewing system.

The network 1306 can be implemented as a wide area network (e.g., the Internet), an intranet, a Digital Subscriber Line (DSL) network infrastructure, or as a point-to-point coupling infrastructure. Additionally, network 1306 can be implemented using any type of network topology and any network communication protocol, and can be represented or otherwise implemented as a combination of two or more networks. A digital network can include various hardwired and/or wireless links 1308(1-N), routers, gateways, and so on to facilitate communication between content provider 1302 and the client systems 1304(1-N). The television-based client systems 1304(1-N) receive program content, program guide data, advertising content, closed captions data, and the like from content server(s) of the content provider 1302 via the IP-based network 1306.

System 1300 includes a media server 1310 that receives program content from a content source 1312, program guide data from a program guide source 1314, and advertising content from an advertisement source 1316. In an embodiment, the media server 1310 represents an acquisition server that receives the audio and video program content from content source 1312, an EPG server that receives the program guide data from program guide source 1314, and/or an advertising management server that receives the advertising content from the advertisement source 1316.

The content source 1312, the program guide source 1314, and the advertisement source 1316 control distribution of the program content, the program guide data, and the advertising content to the media server 1310 and/or to other television-based servers. The program content, program guide data, and advertising content is distributed via various transmission media 1318, such as satellite transmission, radio frequency transmission, cable transmission, and/or via any number of other wired or wireless transmission media. In this example, media server 1310 is shown as an independent component of system 1300 that communicates the program content, program guide data, and advertising content to content provider 1302. In an alternate implementation, media server 1310 can be implemented as a component of content provider 1302.

Content provider 1302 is representative of a headend service in a television-based content distribution system, for example, that provides the program content, program guide data, and advertising content to multiple subscribers (e.g., the television-based client systems 1304(1-N)). The content provider 1302 can be implemented as a satellite operator, a network television operator, a cable operator, and the like to control distribution of program and advertising content, such as movies, television programs, commercials, music, and other audio, video, and/or image content to the client systems 1304(1-N).

Content provider 1302 includes various components to facilitate media data processing and content distribution, such as a subscriber manager 1320, a device monitor 1322, and a content server 1324. The subscriber manager 1320 manages subscriber data, and the device monitor 1322 monitors the client systems 1304(1-N) (e.g., and the subscribers), and maintains monitored client state information.

Although the various managers, servers, and monitors of content provider 1302 (to include the media server 1310 in one embodiment) are illustrated and described as distributed, independent components of content provider 1302, any one or more of the managers, servers, and monitors can be implemented together as a multi-functional component of content provider 1302. Additionally, any one or more of the managers, servers, and monitors described with reference to system 1300 can implement features and embodiments of media content menu navigation and customization.

The television-based client systems 1304(1-N) can be implemented to include a client device 1326 and a display device 1328 (e.g., a television). A client device 1326 of a television-based client system 1304 can be implemented in any number of embodiments, such as a set-top box, a digital video recorder (DVR) and playback system, a personal video recorder (PVR), an appliance device, a gaming system, and as any other type of client device that may be implemented in a television-based entertainment and information system. In an alternate embodiment, client system 1304(N) is implemented with a computing device 1330 as well as a client device 1326. Additionally, any of the client devices 1326 of a client system 1304 can implement features and embodiments of media content menu navigation and customization as described herein.

Although embodiments of media content menu navigation and customization have been described in language specific to structural features and/or methods, it is to be understood that the subject of the appended claims is not necessarily limited to the specific features or methods described. Rather, the specific features and methods are disclosed as exemplary implementations of media content menu navigation and customization.

The invention claimed is:

1. A method, comprising:
    displaying a content menu that includes a listing which collectively identifies media content that is available for viewing from multiple data streams;
    receiving a user-selectable input of the listing to select the media content for viewing;
    receiving the multiple data streams of the media content that are each mapped to a television channel, each data stream of the media content having an associated sub-channel identifier; and
    displaying at least some of the sub channel identifiers and an associated image corresponding to the media content that is available for viewing via the associated sub channel.

2. A method as recited in claim 1, further comprising:
    receiving an additional user selectable input of a sub channel identifier; and
    displaying the media content corresponding to the selected sub channel identifier.

3. A method as recited in claim 2, further comprising initiating the display of the media content corresponding to the selected sub channel identifier by switching sub-channels without changing the television channel.

4. A method as recited in claim 2, wherein the additional user selectable input of the sub channel identifier is received when the sub channel identifier is displayed for viewing.

5. A method as recited in claim 2, wherein the additional user selectable input of the sub channel identifier is received when the sub channel identifier is not displayed for viewing.

6. A method as recited in claim 1, wherein the sub channel identifiers are displayed as sub channel numbers, and wherein the associated image corresponding to the media content is a video of the media content displayed for viewing.

7. A method as recited in claim 1, further comprising displaying the media content that is available for viewing via each sub-channel, and wherein the sub channel identifiers are displayed as sub channel numbers over the respective display of media content to indicate which display of media content is initiated by a sub-channel number.

8. A method as recited in claim 1, further comprising mapping the multiple data streams of the media content to the television channel, and dynamically assigning the sub channel identifiers to each data stream of the media content.

9. A method as recited in claim 1, wherein the multiple data streams each provide different media content that is collectively identified by the listing included in the content menu, and wherein the different media content of each data stream is related.

10. A system, comprising:
    a navigation application configured to initiate display of a content menu that includes a listing which collectively identifies media content that is available for viewing from multiple data streams;
    a television based client system configured to:
        receive the multiple data streams of the media content from a content provider, the multiple data streams each being mapped to a television channel and each data stream of the media content having an associated sub-channel identifier; and
        display at least some of the sub channel identifiers over the corresponding media content that is available for viewing via the associated sub channel.

11. A system as recited in claim 10, wherein the television based client system is further configured to receive an additional user selectable input of a sub channel identifier, and display the media content corresponding to the selected sub channel identifier.

12. A system as recited in claim 11, wherein the navigation application is further configured to initiate the display of the media content corresponding to the selected sub channel identifier by switching sub-channels without changing the television channel.

13. A system as recited in claim 11, wherein the television based client system is further configured to receive the additional user selectable input of the sub channel identifier when the sub channel identifier is displayed for viewing.

14. A system as recited in claim 11, wherein the television based client system is further configured to receive the additional user selectable input of the sub channel identifier when the sub channel identifier is not displayed for viewing.

15. A system as recited in claim 10, wherein the sub channel identifiers are displayed as sub channel numbers over a corresponding video of the media content to indicate which display of media content is initiated by a sub-channel number.

16. A system as recited in claim 10, wherein the multiple data streams each provide different media content that is collectively identified by the listing included in the content menu, and wherein the different media content of each data stream is related.

17. A system as recited in claim 10, further comprising a content provider configured to:
    map the multiple data streams of the media content to the television channel;
    dynamically assign the sub channel identifiers to each data stream of the media content; and
    deliver the multiple data streams mapped to the television channel to the television based client system.

18. One or more computer readable media comprising computer executable instructions that, when executed, direct a television based client system to:
    receive a user-selectable input to select a content menu listing which collectively identifies media content that is available for viewing from multiple data streams;
    receive the multiple data streams of the media content that are each mapped to a television channel, each data stream of the media content having an associated sub-channel identifier; and
    display at least some of the sub channel identifiers and corresponding media content that is available for viewing via the associated sub channel.

19. One or more computer readable media as recited in claim 18, further comprising computer executable instructions that, when executed, direct the television based client system to receive an additional user selectable input of a sub channel identifier, and display the media content corresponding to the selected sub channel identifier.

20. One or more computer readable media as recited in claim 19, further comprising computer executable instructions that, when executed, direct the television based client system to display the media content corresponding to a selected sub channel identifier by switching sub-channels without changing the television channel.

* * * * *